United States Patent
Woodward et al.

(10) Patent No.: US 6,393,033 B1
(45) Date of Patent: May 21, 2002

(54) METHOD AND APPARATUS FOR ENCAPSULATING ISDN DATA IN A BROADBAND NETWORK

(75) Inventors: Ernest Earl Woodward, Chandler; Ali Elahi, Scottsdale; Jeffrey Martin Harris, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/128,263

(22) Filed: Aug. 3, 1998

(51) Int. Cl.[7] ................................................. H04J 3/24
(52) U.S. Cl. .................... 370/474; 370/476; 370/466
(58) Field of Search ............................... 370/474, 476, 370/463, 465, 466, 468, 470, 471, 472, 475

(56) References Cited

U.S. PATENT DOCUMENTS

| | | | | |
|---|---|---|---|---|
| 4,755,992 A | * | 7/1988 | Albal | 370/469 |
| 4,926,420 A | * | 5/1990 | Shimizu | 370/471 |
| 5,208,811 A | | 5/1993 | Kashio et al. | 370/94 |
| 5,467,350 A | | 11/1995 | Price et al. | 370/82 |
| 5,519,702 A | | 5/1996 | Takahashi | 370/84 |
| 5,606,552 A | * | 2/1997 | Baldwin et al. | 370/474 |
| 5,959,996 A | * | 9/1999 | Byers | 370/401 |
| 5,991,817 A | * | 11/1999 | Rowett et al. | 709/250 |
| 6,272,128 B1 | * | 8/2001 | Pierson, Jr. | 370/352 |

OTHER PUBLICATIONS

A publication entitled, "ITU–T I.430 (11/95), ISDN Basic User–Network Interface Layer 1 Specification", International Telecommunication Union, 1996, 98 pages.

* cited by examiner

*Primary Examiner*—Min Jung

(57) ABSTRACT

A system for encapsulating data into data packets to be transmitted through a broadband communications system includes a first B channel buffer (112), a second B channel buffer (114), a D channel buffer (116), a controller (118), and a packet buffer (110). The controller (118) receives 2B+D data on an ISDN line and reformats the data through the use of the buffers so that the resulting packet (50) includes a repeating pattern of 4 bytes of B1 data, 4 bytes of B2 data, and 1 byte of D data. Each packet preferably includes 11 sets of the repeating pattern for a total of 99 bytes of ISDN data in a packet.

20 Claims, 4 Drawing Sheets

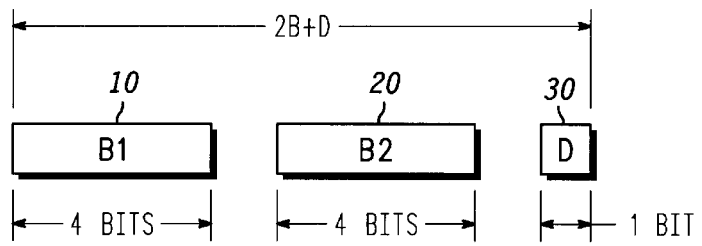
FIG. 1
FIG. 2
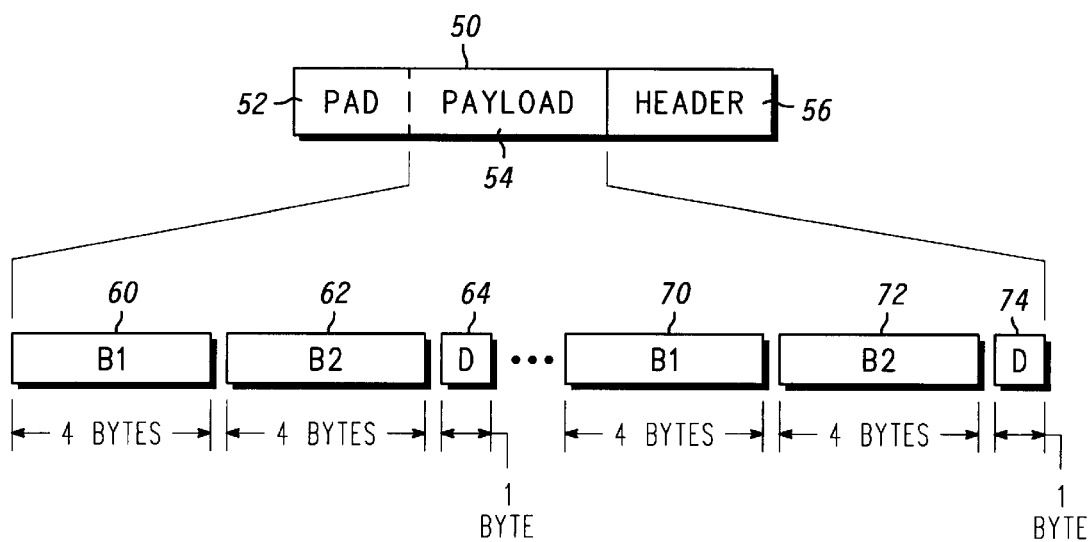

METHOD AND APPARATUS FOR ENCAPSULATING ISDN DATA IN A BROADBAND NETWORK

FIELD OF THE INVENTION

This invention relates in general to the encapsulation of non-native data in a communications system, and in particular, to the encapsulation of ISDN data in a broadband network.

BACKGROUND OF THE INVENTION

Integrated Services Digital Network (ISDN) is a set of internationally agreed to standards specified in documents published by the International Telecommunications Union (ITU). ISDN allows voice, data, and other applications to communicate over wide bandwidth networks. Typically these networks are telephone networks, and ISDN connections through these telephone networks are to end-users as well as service providers.

Modern broadband satellite communications systems are networks which can carry communications between any combination of service providers and end-users. In the past, use of broadband satellite communications networks has been limited to broadcast services, such as television; and to large service providers, such as telephone companies providing international calling services. Now, with the proliferation of broadband satellite communications networks, smaller service providers and even end-users have access to the large bandwidths provided by broadband satellite systems.

Modern broadband satellite communications systems generally are packetized systems, meaning that they carry data in packets, rather than in continuous streams. ISDN, on the other hand, is not a packetized system, and carries information continuously.

It is desirable for broadband satellite communications systems to be able to carry ISDN traffic which emanates from a source external to the satellite communications system because of the potential revenue generated from the sale of bandwidth. What is needed is a method and apparatus for efficiently encapsulating ISDN data in a broadband network which utilizes packets.

BRIEF DESCRIPTION OF THE DRAWINGS

FIG. 1 shows a diagram of ISDN 2B+D data in accordance with a preferred embodiment of the present invention;

FIG. 2 shows a diagram of ISDN data encapsulated within a packet in accordance with a preferred embodiment of the present invention;

DETAILED DESCRIPTION OF THE DRAWINGS

Figure 3:
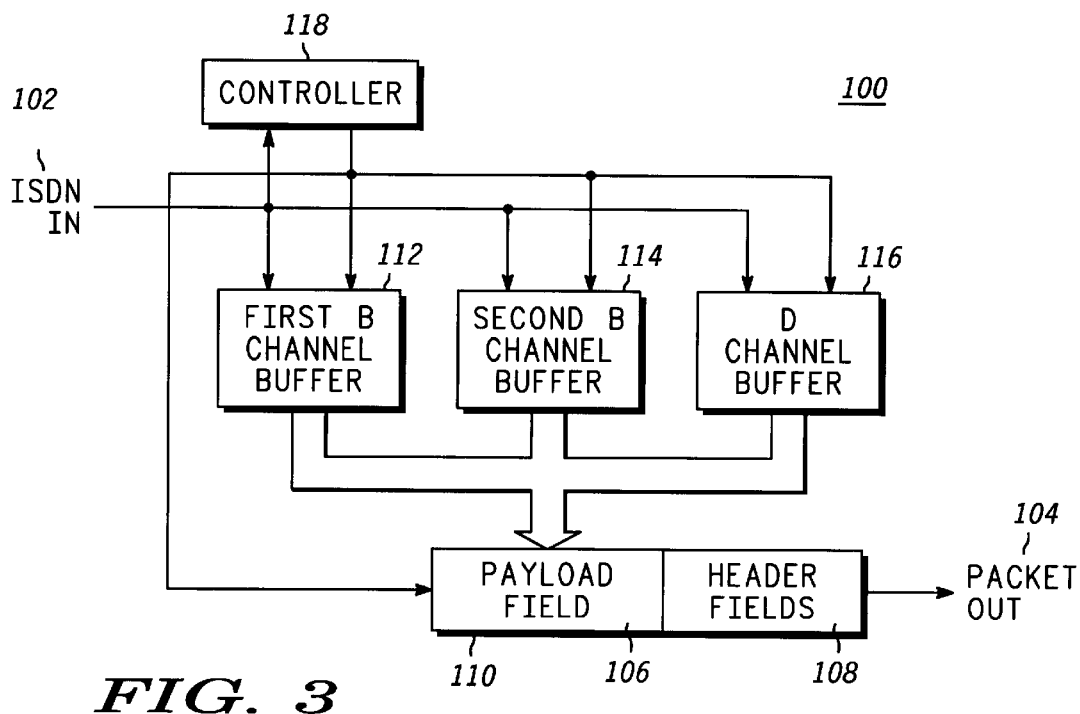
FIG. 3 shows a diagram of a source node for encapsulating ISDN data in packets in accordance with a preferred embodiment of the present invention.

The method and apparatus of the present invention provides an advantageous means for encapsulating ISDN data in packets for transmission in a satellite communications system. A "source node" within the system receives ISDN data from sources outside the system. The source node then formats the ISDN data and inserts them into data packets for transmission within the system. A "receiving node" within the system receives the data packets, removes the ISDN data from within, and sends them on to the intended destination outside the system.

Turning now to the drawings in which like reference characters indicate corresponding elements throughout the several views, attention is first directed to FIG. 1. FIG. 1 shows a diagram of ISDN 2B+D data in accordance with a preferred embodiment of the present invention. FIG. 1 shows 4 bits of B1 data 10, 4 bits of B2 data 20, and 1 bit of D data 30. ISDN data consists of a repeating pattern of 4 bits, 4 bits, and 1 bit of B1 data, B2 data, and D data respectively. The result is three logical channels: B1, B2, and D, all time multiplexed onto a single physical channel. The B1 channel is 64K bits/sec, the B2 channel is 64K bits/sec, and the D channel is 16K bits/sec. The aggregate data rate of all three channels is 144K bits/sec.

The arrangement of the three logical channels as shown in FIG. 1 is commonly referred to as "2B+D". 2B+D data is not byte aligned. Rather, each of the B channels is transmitted 4 bits at a time, and the D channel is transmitted 1 bit at a time. One complete set of 2B+D data is 9 bits long. Most systems operate on data in bytes, so it would be advantageous to encapsulate the 2B+D data in a manner easily handled in bytes. ISDN 2B+D data is discussed and explained in detail in Telecommunication Standardization Sector of International Telecommunications Union (ITU-T) publication I.430 entitled "Integrated Services Digital Network (ISDN) Basic User-Network Interface Layer 1 Specification," the contents of which is hereby incorporated by reference.

FIG. 2 shows a diagram of ISDN data encapsulated within a packet in accordance with a preferred embodiment of the present invention. FIG. 2 shows multiple sets of reformatted 2B+D data. A first set shows 4 bytes of B1 data 60, 4 bytes of B2 data 62, and 1 byte of D data 64. A second set shows 4 bytes of B1 data 70, 4 bytes of B2 data 72, and 1 byte of D data 74. The 2B+D data shown in FIG. 2 has been reformatted such that each of the B1, B2, and D data include at least one byte of information. Each of the logical channels in FIG. 2 preferably includes 8 times as much data as ISDN logical channels normally include. By reformatting the 2B+D data as shown in FIG. 2, the data can be advantageously handled in bytes.

FIG. 2 also shows data packet 50 which is a data packet in a format native to a broadband satellite communications system. Data packet 50 includes header 56, and payload field 54. Payload field 54 optionally includes an unused portion, or "pad" 52. In a preferred embodiment, the length of payload field 54 is 106 bytes. In this preferred embodiment, ninety-nine bytes of ISDN data is preferably included within payload 54 of each data packet 50. When payload field 54 is 106 bytes in length, and 99 bytes of ISDN data is included within payload field 54, pad 52 is 7 bytes long.

Each set of reformatted 2B+D data shown in FIG. 2 occupies 9 bytes. In a preferred embodiment, the 9 byte pattern is repeated 11 times to yield 99 total bytes of reformatted 2B+D data in payload field 54 of data packet 50.

In an alternate embodiment, the length of payload field 54 is 128 bytes. In this alternate embodiment, 126 bytes of ISDN data is preferably included within payload 54 of each data packet 50. When payload field 54 is 128 bytes in length, and 126 bytes of ISDN data is included within payload field 54, pad 52 is 2 bytes long.

Each set of reformatted 2B+D data shown in FIG. 2 occupies 9 bytes. In an alternate embodiment, the 9 byte pattern is repeated 14 times to yield 126 total bytes of reformatted 2B+D data in payload field 54 of data packet 50.

In further alternate embodiments, the length of payload field 54 is other than 106 or 128 bytes in length. In these alternate embodiments, the 9 byte pattern is repeated any number of times.

FIG. 3 shows a diagram of a source node for encapsulating ISDN data in packets in accordance with a preferred embodiment of the present invention. Source node 100 includes packet buffer 110, first B channel buffer 112, second B channel buffer 114, D channel buffer 116, and controller 118. In addition, source node 100 includes input 102 and output 104. Further, packet buffer 110 includes payload field 106 and header fields 108.

In operation, source node 100 receives ISDN data in 2B+D format at input 102. Controller 118 senses the 2B+D data on input 102, and controls the actions of first B channel buffer 112, second B channel buffer 114, D channel buffer 116, and packet buffer 110. As 2B+D data arrives in the native ISDN format on input 102, controller 118 parses the 2B+D data and writes the data to the appropriate channel buffer. For example, when 4 bits of B1 data arrives, controller 118 writes the 4 bits of B1 data to first B channel buffer 112. When 4 bits of B2 data arrives, controller 118 writes the 4 bits of B2 data to second B channel buffer 114. When 1 bit of D data arrives, controller 118 writes the 1 bit of D data to the D channel buffer. This pattern preferably repeats 8 times so that first B channel buffer 112 includes 4 bytes of B1 data, second B channel buffer 114 includes 4 bytes of B2 data, and D channel buffer 116 includes 1 byte of D data. Controller 118 then causes the contents of first B channel buffer 112, second B channel buffer 114, and D channel buffer 116 to be written to payload field 106 of packet buffer 110 such that payload field 106 of packet buffer 110 includes reformatted 2B+D data in a sequence that includes 4 bytes of B1 data, 4 bytes of B2 data, and 1 byte of D data.

In a preferred embodiment, payload field 106 is 106 bytes long, and the sequence of reformatted 2B+D data occupies 99 bytes. The remaining 7 bytes of payload field 106 is left as pad. This corresponds to channel buffers 112, 114, and 116 filling up 11 times, and being written to packet buffer 110 11 times. When payload field 106 is full, packet buffer 110 empties as the packet is sent out on output 104.

In an alternate embodiment, payload field 106 is 128 bytes long, and the sequence of reformatted 2B+D data occupies 126 bytes. The remaining 2 bytes of payload field 106 is left as pad. This corresponds to channel buffers 112, 114, and 116 filling up 14 times, and being written to packet buffer 110 14 times. When payload field 106 is full, packet buffer 110 empties as the packet is sent out on output 104.

In further alternate embodiments, payload field 106 of packet buffer 110 is a length other than 106 or 128 bytes and pad may not be necessary.

The preferred embodiment as shown and described with reference to FIG. 3 includes channel buffers to hold B1, B2, and D data prior to filling packet buffer 110. In an alternate embodiment, channel buffers 112, 114, and 116 are omitted and controller 118 writes ISDN 2B+D data directly to payload field 106 in the repeating pattern described above. In another alternate embodiment, packet buffer 110 is comprised of channel buffers 112, 114, and 116.

In another alternate embodiment, the functionality shown in FIG. 3 is included within a digital processor. In this embodiment, all of, or some of, controller 118, first B channel buffer 112, second B channel buffer 114, D channel buffer 116, and packet buffer 110 are implemented in a microprocessor, digital signal processor, or the like. In response to program words stored in a memory, the processor receives ISDN data, and builds data packets using the buffers. The processor can include the aforementioned functionality either in hardware or software. Other configurations of either hardware and/or software capable of implementing the functionality as shown in FIG. 3 are possible, and these configurations are intended to be included within the scope of the present invention.

Figure 4:
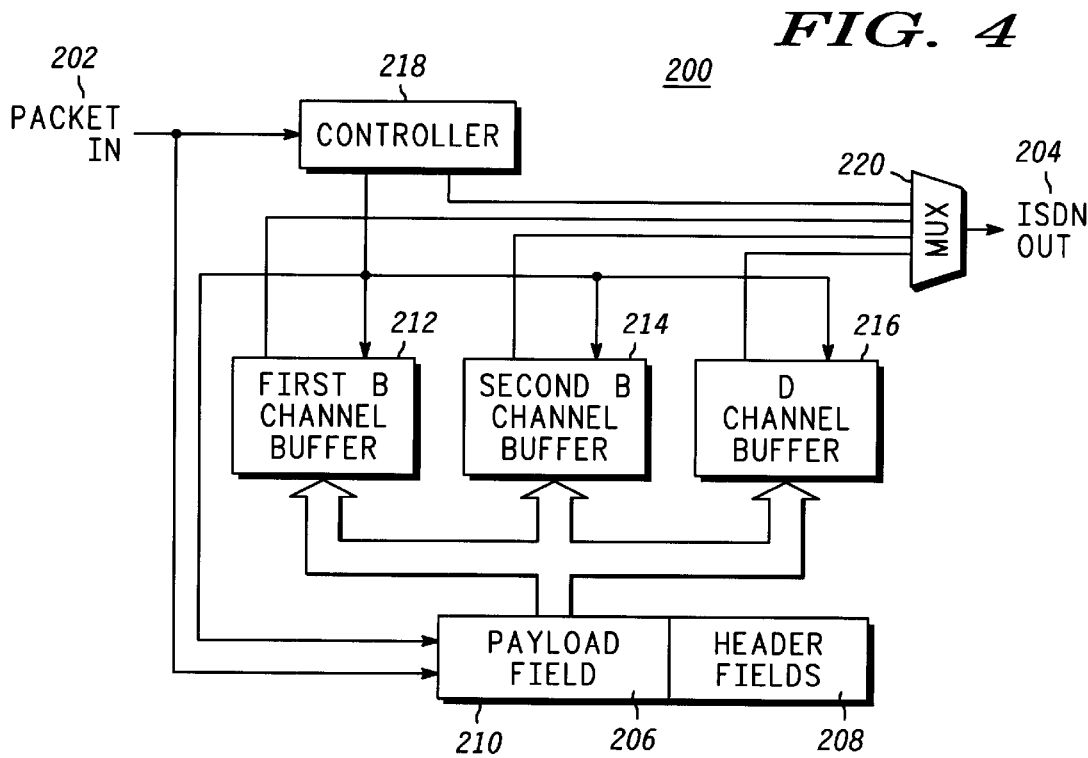
FIG. 4 shows a diagram of a receiving node for de-encapsulating ISDN data from packets in accordance with a preferred embodiment of the present invention.

FIG. 4 shows a diagram of a receiving node for de-encapsulating ISDN data from packets in accordance with a preferred embodiment of the present invention. Receiving node 200 includes packet buffer 210, first B channel buffer 212, second B channel buffer 214, D channel buffer 216, multiplexer 220, and controller 218. In addition, receiving node 200 includes input 202 and output 204. Packets from the broadband network are received at input 202, and ISDN 2B+D data are output on output 204.

In operation, controller 218 senses when packets arrive at input 202, and controls the writing of the data packet to packet buffer 210, first B channel buffer 212, second B channel buffer 214, and D channel buffer 216. Controller 218 also preferably controls multiplexer 220. When a packet arrives at input 202, controller 218 writes the contents of the packet to packet buffer 210. Payload field 206 then includes 2B+D data in a repeating data pattern of 4 bytes of B1 data, 4 bytes of B2 data, and 1 byte of D data. Controller 218 causes the first four bytes of B1 data to be written from payload field 206 to first B channel buffer 212, the first four bytes of B2 data to be written from payload field 206 to second B channel buffer 214, and the first byte of D data to be written from payload field 206 to D channel buffer 216. Then controller 218 controls first B channel buffer 212, second B channel buffer 214, D channel buffer 216, and multiplexer 220 such that a repeating pattern of 4 bits of B1 data, 4 bits of B2 data, and 1 bit of D data appears at output 220.

In a preferred embodiment, payload field 206 is 106 bytes long, and a received packet utilizes 99 bytes of the available 106 bytes. This corresponds to 11 sets of data within the payload of the received packet, where a single set includes the combination of: 4 bytes of B1 data, 4 bytes of B2 data, and 1 byte of D data. In this preferred embodiment, first B channel buffer 212 is 4 bytes long, second B channel buffer 214 is 4 bytes long, D channel buffer 216 is 1 byte long, and each is filled 11 times from payload field 206 for each received packet.

In an alternate embodiment, payload field 206 is 128 bytes long, and a received packet utilizes 126 bytes of the available 128 bytes. This corresponds to 14 sets of data within the payload of the received packet, where a single set includes the combination of: 4 bytes of B1 data, 4 bytes of B2 data, and 1 byte of D data. In this alternate embodiment, first B channel buffer 212 is 4 bytes long, second B channel buffer 214 is 4 bytes long, D channel buffer 216 is 1 byte long, and each is filled 14 times from payload field 206 for each received packet.

In further alternate embodiments, the buffer sizes are different than those previously set forth. In one such alternate embodiment, payload field 206 is 106 bytes long, and 99 of those bytes are used by the received packet, first B channel buffer 212 is 44 bytes long, second B channel buffer 214 is 44 bytes long, and D channel buffer 216 is 11 bytes long. In another such alternate embodiment, payload field 206 is 128 bytes long, and 126 of those bytes are used by the received packet, first B channel buffer 212 is 56 bytes long, second B channel buffer 214 is 56 bytes long, and D channel buffer 216 is 14 bytes long. In these alternate embodiments, the entire contents of payload field 206 is written to the first B channel buffer 212, second B channel buffer 214, and D channel buffer 216 as soon as payload field 206 receives a packet.

In another alternate embodiment, the functionality shown in FIG. 4 is included within a digital processor. In this embodiment, all of, or some of, controller 218, first B channel buffer 212, second B channel buffer 214, D channel buffer 216, and packet buffer 210 are implemented in a microprocessor, digital signal processor, or the like. In response to program words stored in a memory, the processor receives packets, and de-encapsulates ISDN 2B+D data using the buffers. The processor can include the aforementioned functionality either in hardware or software. Other configurations of either hardware and/or software capable of implementing the functionality as shown in FIG. 4 are possible, and these configurations are intended to be included within the scope of the present invention.

Figure 5:
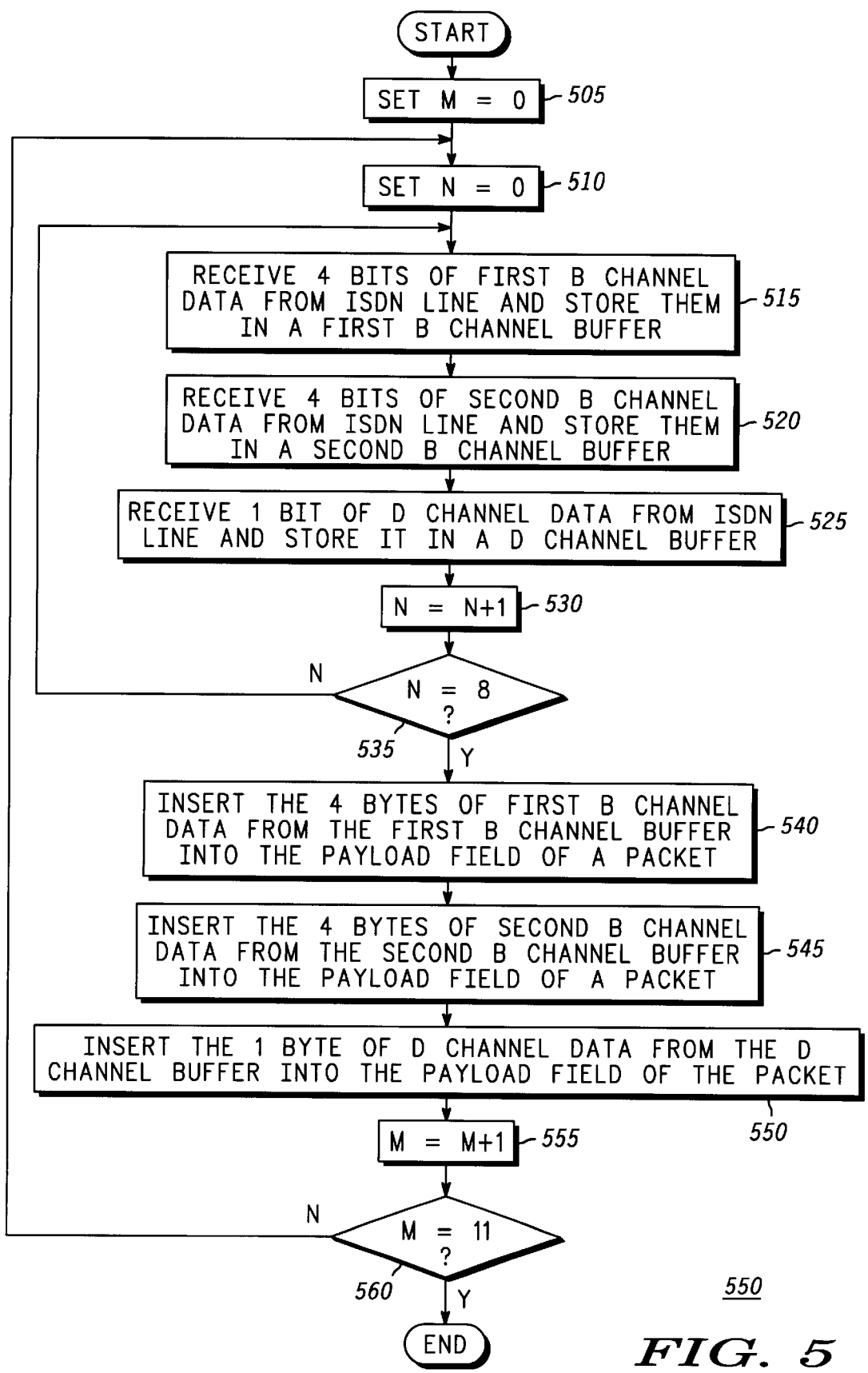
FIG. 5 shows a flowchart for a method of encapsulating ISDN data in packets in accordance with a preferred embodiment of the present invention.

FIG. 5 shows a flowchart for a method of encapsulating ISDN data in packets in accordance with a preferred embodiment of the present invention. Method 500 begins with step 505. In step 505, a counter symbolized by upper case "M" is set equal to 0. Then in step 510, a different counter symbolized by upper case "N" is set equal to 0. In step 515, 4 bits of first B channel data is received from an ISDN line and stored in a first B channel buffer. In step 520, 4 bits of second B channel data is received from the ISDN line and stored in a second B channel buffer. In step 525, 1 bit of D channel data is received from the ISDN line and stored in a D channel buffer. In step 530, N is incremented. In step 535, N is compared with 8. If N equals eight, processing proceeds with step 540. If N does not equal eight, processing branches back to step 515. In the latter case, steps 515, 520, 525, and 530 are repeated so that each is executed a total of eight times.

When N equals eight in step 535, processing branches from step 535 to step 540. As a result of the repeated execution of steps 515, 520, 525, and 530, the first B channel buffer includes four bytes of data, the second B channel buffer includes four bytes of data, and the D channel buffer includes one byte of data. In step 540, the 4 bytes of first B channel data from the first B channel buffer are inserted into the payload field of a packet. In step 545, 4 bytes of second B channel data from the second B channel buffer are inserted into the payload field of the packet. In step 550, 1 byte of D channel data from the D channel buffer is inserted into the payload field of the packet. In step 555, M is incremented. Then, in step 560, M is compared with 11. When M equals 11, processing ends. When M does not equal 11, processing branches back to step 510 where N is set equal to 0.

In a preferred embodiment as exemplified by method 500, B1 data, B2 data, and D data are retrieved from an ISDN line until 4 bytes of B1 data, 4 bytes of B2 data, and 1 byte of D data are stored in separate buffers. Then, the buffers are emptied into the payload field of the packet, thereby creating a pattern within the payload field of the packet. The resulting pattern in the packet is comprised of repeating sets of 4 bytes of B1 data, 4 bytes of B2 data, and one byte of D data. Also in a preferred embodiment as exemplified by method 500, the pattern repeats 11 times resulting in a total of 99 bytes of ISDN data in the payload field of the packet. In an alternate embodiment, the pattern repeats 14 times resulting in a total of 126 bytes of ISDN data in the payload field of the packet. In this alternate embodiment, M is compared with 14 in step 560.

In another alternate embodiment, steps 515, 520, and 525 write ISDN data directly into the payload field of the packet, and bypass the channel buffers.

Figure 6:
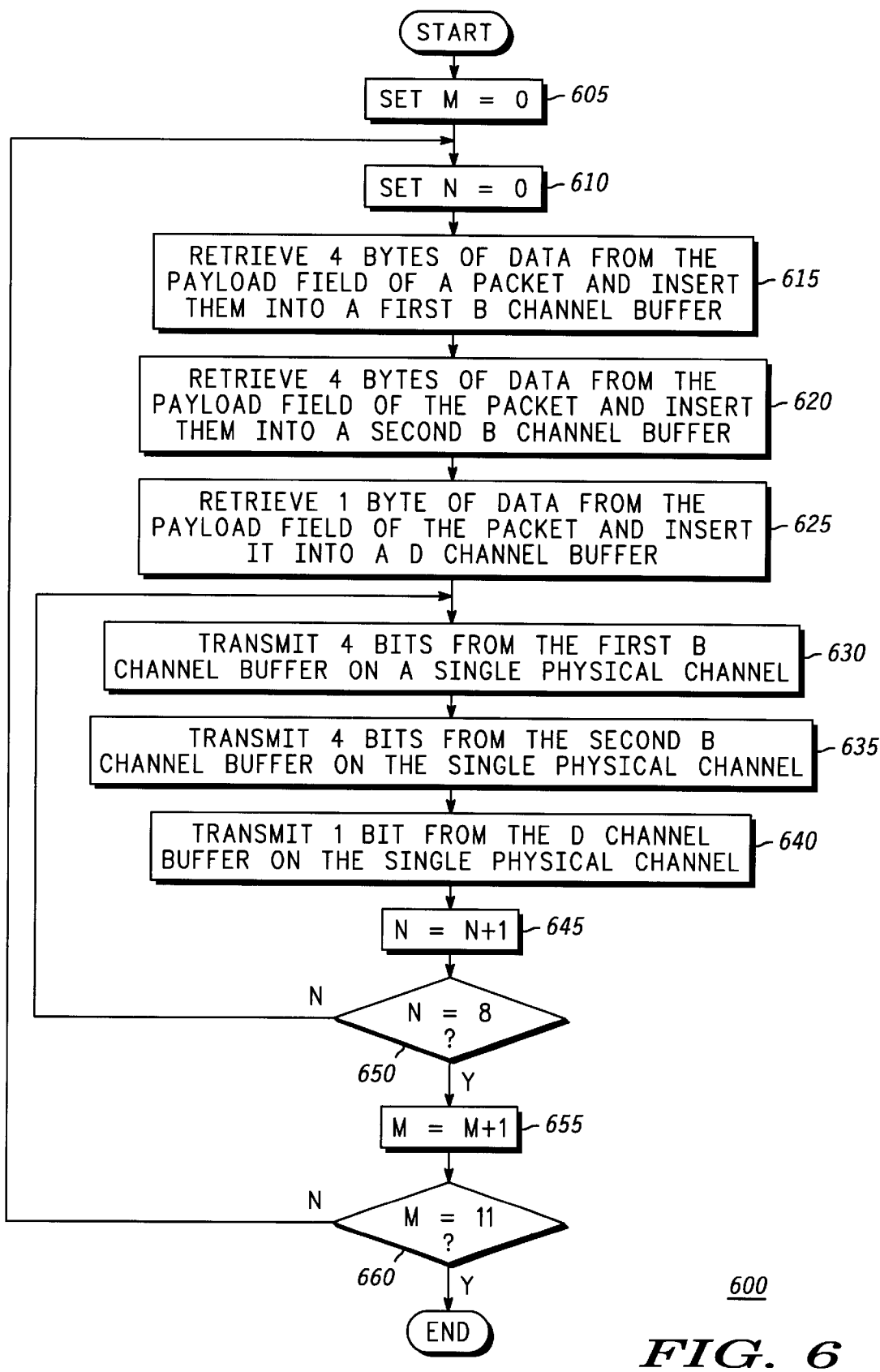
FIG. 6 shows a flowchart for a method of de-encapsulating ISDN data from packets in accordance with a preferred embodiment of the present invention.

FIG. 6 shows a flowchart for a method of de-encapsulating ISDN data from packets in accordance with a preferred embodiment of the present invention. Method 600 begins with step 605 where a counter, symbolized by uppercase "M", is set equal to 0. In step 610, a counter symbolized by uppercase "N", is set equal to 0. In step 615, 4 bytes of data are retrieved from the payload field of a packet and inserted into a first B channel buffer. In step 620, 4 bytes of data are retrieved from the payload field of the packet and are inserted into a second B channel buffer. In step 625, one byte of data is retrieved from the payload field of the packet and inserted into the D channel buffer.

In step 630, 4 bits from the first B channel buffer are transmitted on a single physical channel. In step 635, 4 bits from the second B channel buffer are transmitted on the single physical channel. In step 640, 1 bit from the D channel buffer is transmitted on the single physical channel. In step 645, N is incremented. Then, in step 650, N is compared with 8. When N equals 8, processing proceeds with step 655. When N does not equal 8, processing branches back to step 630.

The inner loop comprised of steps 630, 635, 640, and 645 empties the first B channel buffer, the second B channel buffer, and the D channel buffer. When the buffers have been emptied, and N equals 8 in step 650, M is incremented in step 655. If M equals 11 in step 660, processing ends. Otherwise, processing branches back to step 610 where N is equal to 0.

In a preferred embodiment as exemplified by method 600, the combined loops of method 600 function to retrieve 99 bytes of formatted ISDN data from a packet, and to transmit that data in the familiar 2B+D format on an ISDN line. In an alternate embodiment, M is compared to 14 in step 660, and the combined loops of method 600 function to retrieve 126 bytes of formatted ISDN data from a packet, and to transmit that data in the 2B+D format on an ISDN line.

In summary, the method and apparatus of the present invention provides an advantageous means for encapsulating ISDN data into data packets to be used within a broadband satellite communications system. Additionally, the method and apparatus of the present invention provides an advantageous means for de-encapsulating ISDN data from the data packets.

While we have shown and described specific embodiments of the present invention, further modifications and improvements will occur to those skilled in the art. For example, the specific embodiments have been described in the context of a satellite communications system. One skilled in the art will appreciate that the method and apparatus of the present invention is applicable to any type of system capable of carrying ISDN traffic, and is not intended to be limited to satellite communications systems. We desire it to be understood, therefore, that this invention is not limited to the particular forms shown and we intend in the appended claims to cover all modifications that do not depart from the spirit and scope of this invention.

What is claimed is:
1. A method of encapsulating ISDN data into a payload field of a data packet, where the ISDN data arrives as a first

B channel, a second B channel, and a D channel, all time-multiplexed onto a single physical channel, said method comprising the steps of:

(a) receiving 4 bits of first B channel data from the single physical channel and inserting them in the payload field of the data packet, receiving 4 bits of second B channel data from the single physical channel and inserting them in the payload field of the data packet, and receiving 1 bit of D channel data from the single physical channel and inserting it in the payload field of the data packet;

(b) repeating step (a) 7 times to yield 4 bytes of first B channel data, 4 bytes of second B channel data, and 1 byte of D channel data in the payload field of the data packet; and wherein the data is arranged in the payload field of the data packet such that a pattern exists which comprises 4 bytes of first B channel data, 4 bytes of second B channel data, and 1 byte of D channel data.

2. The method of claim 1 further comprising the step of repeating steps (a) and (b) 14 times to yield 126 bytes of ISDN data in the payload field of the packet, wherein the ISDN data is arranged in the payload field of the packet such that a repeating pattern exists which comprises 4 bytes of first B channel data, 4 bytes of second B channel data, and 1 byte of D channel data.

3. The method of claim 2 wherein the payload field of the packet comprises 128 bytes.

4. The method of claim 1 wherein the payload field of the packet comprises 106 bytes.

5. An apparatus for encapsulating ISDN data in a payload field of a packet, said apparatus comprising:

an input and an output;

a first B channel buffer responsive to a first set of control signals, for storing first B channel data received from the input;

a second B channel buffer responsive to a second set of control signals, for storing second B channel data from the input;

a D channel buffer responsive to a third set of control signals, for storing D channel data received from the input;

a packet buffer which includes a payload field, wherein the packet buffer is responsive to a fourth set of control signals, and the payload field receives first B channel data from the first B channel buffer, second B channel data from the second B channel buffer, and D channel data from the D channel buffer, and sends completed packets to the output; and a controller responsive to the input, wherein the controller produces the first through fourth sets of control signals, and causes the ISDN data to be arranged in the payload field of the packet buffer such that a repeating pattern exists which comprises 4 bytes of first B channel data, 4 bytes of second B channel data, and 1 byte of D channel data.

6. The apparatus of claim 5 wherein the repeating pattern includes 99 bytes of ISDN data in the payload field of the packet buffer, wherein the ISDN data in the payload field of the packet buffer is arranged in 11 sets of: 4 bytes of first B channel data, 4 bytes of second B channel data, and 1 byte of D channel data.

7. The apparatus of claim 6 wherein the payload field of the packet buffer comprises 106 bytes.

8. The apparatus of claim 5 wherein the repeating pattern includes 126 bytes of ISDN data in the payload field of the packet buffer, wherein the ISDN data in the payload field of the packet buffer is arranged in 14 sets of: 4 bytes of first B channel data, 4 bytes of second B channel data, and 1 byte of D channel data.

9. The apparatus of claim 8 wherein the payload field of the packet buffer comprises 128 bytes.

10. The apparatus of claim 5 wherein the payload field of the packet buffer comprises 106 bytes.

11. The apparatus of claim 5 wherein the controller in included within a digital processor.

12. The apparatus of claim 11 wherein the first B channel buffer, the second B channel buffer, and the D channel buffer are included within the digital processor.

13. An apparatus for de-encapsulating ISDN data from a payload field of a packet, said apparatus comprising:

an input and an output;

a packet buffer which includes a payload field, wherein the packet buffer, responsive to a fourth set of control signals, receives a packet from the input, and wherein the payload field includes ISDN data such that a repeating pattern exists which comprises 4 bytes of first B channel data, 4 bytes of second B channel data, and 1 byte of D channel data;

a first B channel buffer which, responsive to a first set of control signals, receives first B channel data from the payload field of the packet buffer;

a second B channel buffer which, responsive to a second set of control signals, receives second B channel data from the payload field of the packet buffer;

a D channel buffer which, responsive to a third set of control signals, receives D channel data from the payload field of the packet buffer; and a controller responsive to the input, wherein the controller produces the first through fourth sets of control signals, and causes ISDN data to be read from the first B channel buffer, the second B channel buffer, and the D channel buffer in a repeating sequence which comprises 4 bits of first B channel data, 4 bits of second B channel data, and 1 bit of D channel data.

14. The apparatus of claim 13 wherein the repeating pattern includes 99 bytes of ISDN data, wherein the ISDN data in the payload field of the packet buffer is arranged in 11 sets of: 4 bytes of first B channel data, 4 bytes of second B channel data, and 1 byte of D channel data.

15. The apparatus of claim 14 wherein the payload field of the packet buffer comprises 106 bytes.

16. The apparatus of claim 13 wherein the repeating pattern includes 126 bytes of ISDN data, wherein the ISDN data in the payload field of the packet buffer is arranged in 14 sets of: 4 bytes of first B channel data, 4 bytes of second B channel data, and 1 byte of D channel data.

17. The apparatus of claim 16 wherein the payload field of the packet buffer comprises 128 bytes.

18. The apparatus of claim 13 wherein the payload field of the packet buffer comprises 106 bytes.

19. The apparatus of claim 13 wherein the controller in included within a digital processor.

20. The apparatus of claim 19 wherein the first B channel buffer, the second B channel buffer, and the D channel buffer are included within the digital processor.

* * * * *